March 28, 1950 W. M. HARRISON 2,502,321
CARRIAGE POSITIONING CONTROL MECHANISM
Filed May 23, 1947 4 Sheets-Sheet 1
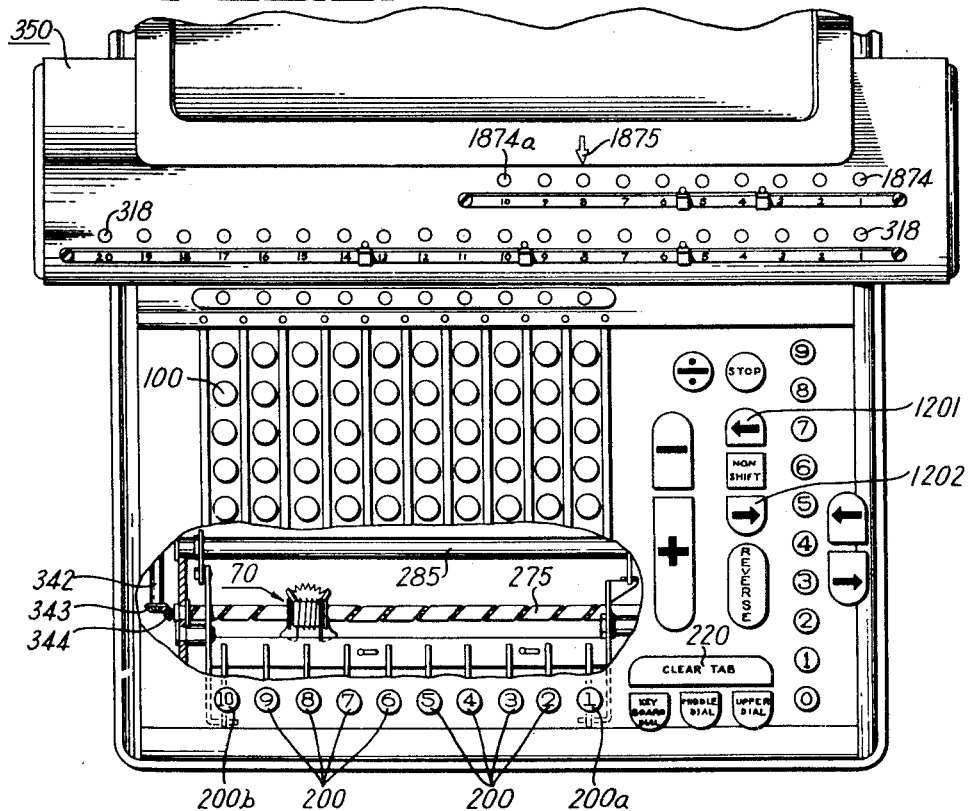
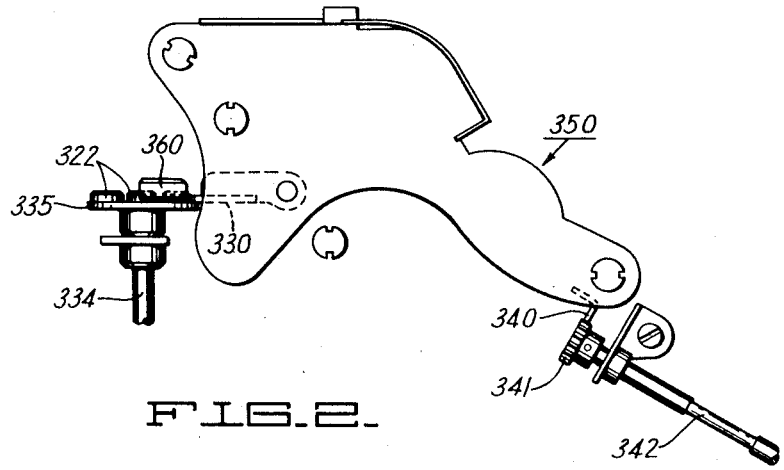
INVENTOR:
WILLIAM M. HARRISON
BY
Howard M. Dustin March 28, 1950 W. M. HARRISON 2,502,321
CARRIAGE POSITIONING CONTROL MECHANISM
Filed May 23, 1947 4 Sheets-Sheet 2

INVENTOR:
WILLIAM M. HARRISON
BY
Howard M. Dustin

March 28, 1950  W. M. HARRISON  2,502,321
CARRIAGE POSITIONING CONTROL MECHANISM
Filed May 23, 1947  4 Sheets-Sheet 3
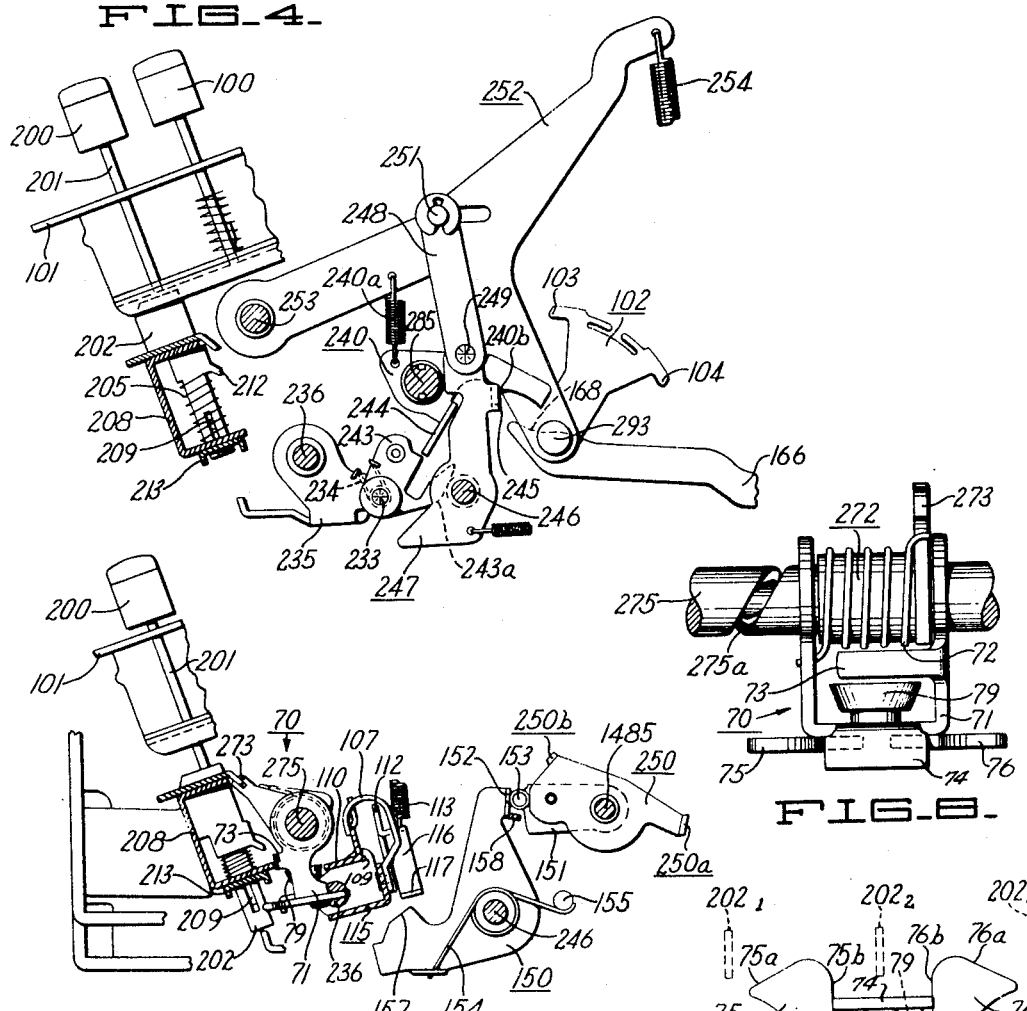
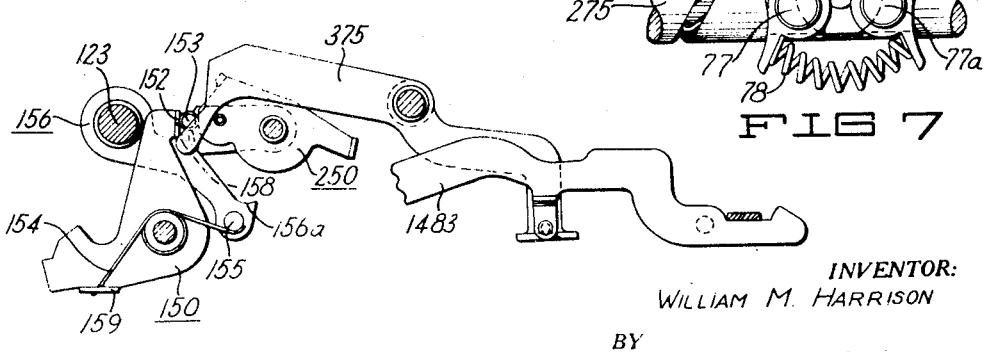
INVENTOR:
WILLIAM M. HARRISON
BY
Howard M. Dustin March 28, 1950 W. M. HARRISON 2,502,321
CARRIAGE POSITIONING CONTROL MECHANISM
Filed May 23, 1947 4 Sheets-Sheet 4

INVENTOR:
WILLIAM M. HARRISON
BY
Howard M. Dustin

Patented Mar. 28, 1950

2,502,321

UNITED STATES PATENT OFFICE 2,502,321

CARRIAGE POSITIONING CONTROL MECHANISM

William M. Harrison, San Francisco, Calif., assignor to Marchant Calculating Machine Company, a corporation of California Application May 23, 1947, Serial No. 749,924

4 Claims. (Cl. 235—63)

The present invention relates to carriage shift control mechanisms for calculating machines and the like and more particularly concerns what is generally known as tabulator shift mechanisms for such machines.

Modern accounting systems require the performance of many multiple or sequential calculations involving several mathematical factors of a series of such calculations and it therefore becomes necessary to selectively position the carriage in different ordinal relations to the factors set on the keyboard.

Prior art tabulators such as that shown in the Avery Patent No. 2,365,324 provide a series of columnar tabulator keys, one of which may be depressed to bring the carriage directly to the position corresponding to the key depressed, or a selected columnar tabulator key may be latched down so that the carriage will invariably return to the selected position upon depression of a tabulator initiating key.

Other prior art tabulators such as that shown in the Dustin Patent No. 2,428,206 provide a series of tabulator keys, any number of which may be depressed simultaneously and latched down whereby depression of the tabulator initiating key will bring the carriage to a position corresponding to one of the tabulator keys which is latched down, while a second depression of the same initiating key will bring the carriage to a second position corresponding to another such tabulator key. The above mechanism, however, exercises control over the shifting mechanism during carriage movement in only one direction and invariably stops the carriage in the position corresponding to the latched tabulator key during the carriage shifting movement in that one direction.

The calculating machine in connection with which the present invention is disclosed includes two shift direction keys and related mechanism described and claimed in an Avery Patent No. 2,216,659 which keys control the direction in which the carriage is shifted during multiplication calculations. These same two keys are utilized in the present invention to control and determine the direction of a carriage movement during a tabulator shift which is opposite to the direction of the carriage shifting movement during a multiplication calculation. The columnar tabulator keys and related mechanism of the present invention are therefore arranged to terminate a tabulator shifting operation in either direction and to thus bring the carriage to a selected position from either direction.

The present invention also includes mechanism which is operable by either end columnar tabulator key to render any intermediate key ineffective to stop the carriage in the position corresponding to the intermediate key depressed, so that regardless of which one or how many tabulator keys are depressed the carriage may be returned to either end position and it may do so without disturbing the setting of the intermediate tabulator keys. A calculation may then be performed and the carriage shifted from either end position to a selected intermediate position under the control of the undisturbed tabulator key or keys. If desired, the carriage may then be shifted to another selected intermediate position by a second depression of the tabulator initiating key.

The present invention is therefore based upon the principle of alternatively controlling the tabulator shifting mechanism by one or more of the tabulator keys which may be set and latched down in advance of a series of calculations, so that following each calculation of the series the carriage may be shifted in either direction to one or more selected intermediate positions or to either end position. One calculation after another may therefore be performed in the various positions of the carriage without having to change the tabulator setting.

In order to illustrate the extent to which the advantages may be realized by application of this principle according to the present invention, it is disclosed herein as embodied in the commercially known Marchant calculating machine as shown and described in the Avery Patent No. 2,271,240, but while the above principle is applied to a machine having a transversely shiftable register carriage it is equally applicable to a machine having a stationary register with transversely shiftable actuating or transmission mechanism for the register or any equivalent shifting mechanism for associating the factor entering means with successive denominational orders of the register.

It is therefore a general object of the invention to control the shifting movement of the carriage in either direction to any one or more of a series of carriage positions.

It is a further object to establish a plurality of tabulator settings for controlling the movement of the carriage to a corresponding plurality of carriage positions and to supersede such tabulator settings and selectively control movement of the carriage through said plurality of positions to either end position.

It is a further object to establish a tabulator setting corresponding to a given carriage position and to control movement of the carriage through said given position to another carriage position without disturbing the tabulator setting.

It is a further object of the invention to select the direction in which the carriage is to be shifted for tabulation of the carriage to a given position and to control movement of the carriage to either end position regardless of the direction selected for such tabulation.

Other objects and advantages of the invention will be apparent from the following description of the preferred embodiment thereof, as illustrated in the accompanying drawings, in which:

Fig. 1 is a top exterior view of a calculating machine embodying the present invention showing the tabulator keys and part of the tabulator mechanism for controlling the carriage shifting mechanism.

Fig. 2 is a fragmentary side view taken from the left showing a portion of the driving means from the carriage to the tabulator mechanism.

Fig. 4 is a right side view showing an intermediate tabulator key and means for initiating a tabulator shift.

Fig. 5 is a right side view of the shift terminating mechanism effected by an intermediate tabulator key.

Fig. 6 is an enlarged detail view of part of the mechanism of Fig. 5 taken from the front of the machine showing the traveling tabulator tripping member and the worm drive therefor.

Fig. 7 is an enlarged bottom view of the mechanism shown in Fig. 6.

Fig. 8 is a right side view showing a portion of the mechanism for terminating a shift of the carriage in end position.

Carriage shifting mechanism

The carriage shifting mechanism in connection with which the present invention is disclosed includes a transmission mechanism deriving its power from an electric motor not shown and a shift clutch and reversing mechanism disclosed and claimed in Avery et al. Patent No. 2,162,238 issued June 13, 1939.

Figure 3:
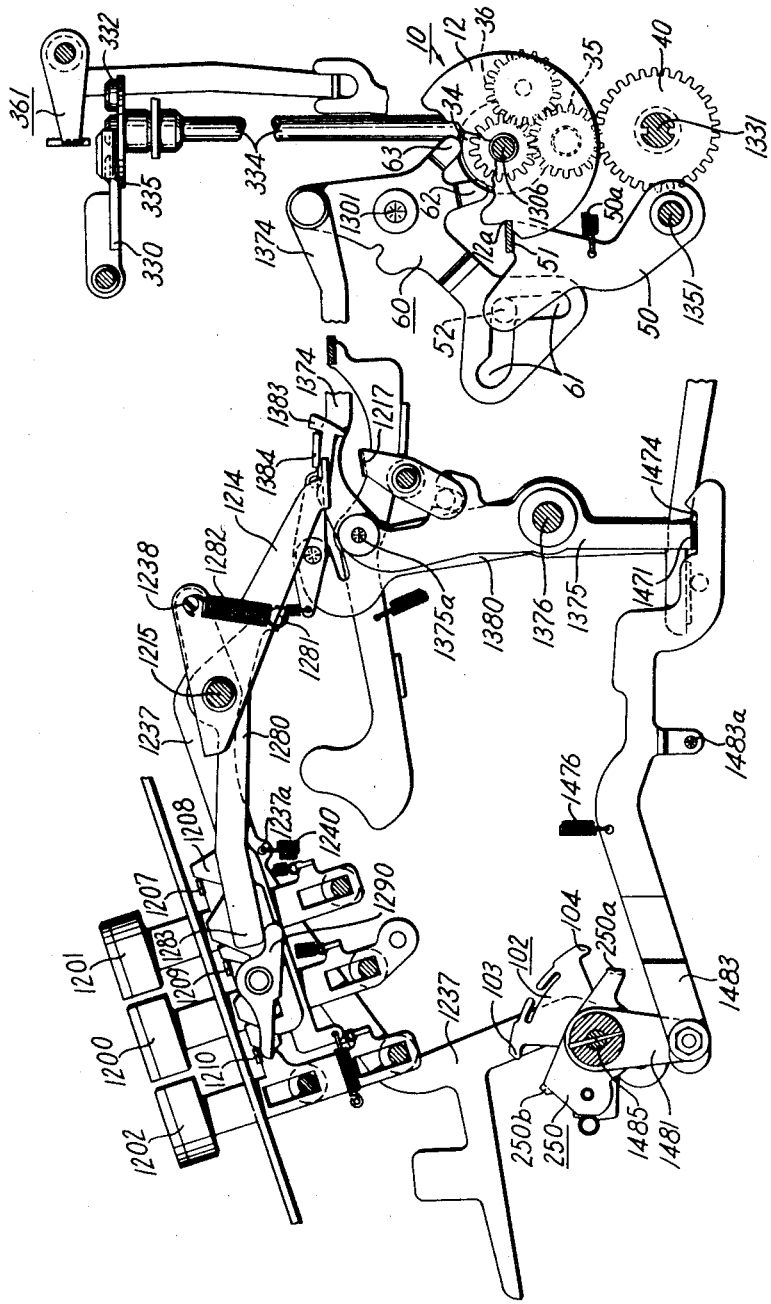
Fig. 3 is a side elevation as viewed from the right, illustrating the shift mechanism, means for presetting the direction of shift, and a portion of the mechanism for terminating a shift of the carriage in end position.

This shift clutch 10 shown in Fig. 3 is of the ratchet type and is normally held in disengaged condition by a clutch dog 50. When the clutch dog is rocked toward the left as viewed in Fig. 3 by a mechanism described hereinafter the clutch becomes engaged in a manner described in said patent and rotates in clockwise direction. The shift clutch 10 is what is known as a full revolution clutch which is capable of being disengaged only after one or more full revolutions thereof.

If the clutch dog 50 is released immediately after it is rocked toward the left, a spring 50a urges the dog toward the right against the periphery of the clutch disc 12, which holds the clutch dog 50 in its clutch engaging position throughout the cycle. Near the end of the full revolution cycle an ear 51 on the clutch dog drops into a notch 12a of the disc and thus causes disengagement of the clutch after it has completed one full revolution. If the clutch dog 50 is held in clutch engaging position by the shift controlling mechanism described hereinafter, the clutch will continue to rotate through one or more cycles and drive the carriage through one or more of its operating positions until the clutch is permitted to disengage.

A spline reversing unit also described in said patents is interposed between the clutch 10 and the carriage so that rotation of the clutch in one direction may drive the carriage in either of two opposite directions. The reversing unit includes a collar 34 which is moved toward the left or right as viewed from the front of the machine so as to effect a driving connection from the clutch through gears 35 and 40 to the shaft 1331 or through the reverse gear 36 and gears 35 and 40 to the same shaft. The shaft 1331 is thus driven in two opposite directions in accordance with the setting of the reverse unit and through suitable gearing shown in the last mentioned patent drives the vertical shaft 334 in either of two directions. Secured to the upper end of shaft 334 is a disc 335 upon which is mounted rollers 332 meshing with a rack 330 mounted on the carriage, the rollers successively engaging the teeth of the rack in such a manner as to shift the carriage toward the left or right, depending upon which direction the shaft 334 is rotated.

Carriage shift control mechanism

Means are provided whereby the depression of any one of the tabulator keys 200, 200a, 200b, or 220 (Fig. 1) will shift the collar 34 (Fig. 3) to one or the other of its effective positions, and cause engagement of the shift clutch 10 in order to shift the carriage in the desired direction.

This means includes a control lever 250 which is rockable in a clockwise or counter-clockwise direction from the intermediate position shown in Fig. 3. Member 250 is fixed to a shaft 1485 which carries a lever 1481 so that the latter lever is rocked clockwise or counter-clockwise with member 250. A link 1483 is connected at its left end to the lower end of lever 1481 and is provided with a notch 1474 at its right end to embrace an ear 1471 formed on the lower end of a lever 1375 which is mounted for free rocking movement upon a shaft 1376.

The upper end of lever 1375 is pivotally connected by a stud 1375a to a link 1374 which is pivotally secured at its other end to a clutch control member 60 pivoted at 1301, and provided with two fingers 62 and 63 which engage opposite beveled sides of collar 34.

The control lever 250 is rocked in either a clockwise or counter-clockwise direction from the position shown in Fig. 3, depending upon which one of the aforementioned tabulator keys is depressed. If lever 250 is rocked clockwise, it will cause lever 1481 to also be rocked in this direction and by means of link 1483, lever 1375 and link 1374 will rock member 60 clockwise and thereby lower finger 63 upon the beveled right side of collar 34 as viewed from the front of the machine, and force the collar toward the left along a shaft 1306 so as to position the reversing spline for a rightward carriage shifting movement as fully disclosed in the aforementioned Avery Patent No. 2,162,238. If the control lever 250 is rocked in a counter-clockwise direction, the member 60 will also be rocked counter-clockwise and press the finger 62 against the beveled left side of collar 34 to slide the collar toward the right in position for a leftward carriage shifting movement.

Member 60 is also provided with an angular slot 61 embracing a stud 52 of control dog 50 pivotally mounted on shaft 1351. As the lever 60 is being rocked in either direction from its central position, the stud 52 is forced into either extreme end of the slot 61 to thereby rock the control dog 50 toward the left to clutch engaging position. The collar 34 is thus set for determining the direction of the carriage shift, at the same time the clutch control dog 50 is rocked to cause engagement of the shift clutch 10. When the clutch becomes engaged, it remains in engagement until the carriage reaches a selected position. The shift control member 60 and control dog 50 are released slightly in advance of the full cycle position of the clutch and the corresponding selected carriage position, but the periphery of the disc holds the member 60 and dog 50 in their clutch engaging positions until the clutch reaches its full cycle position.

In the full cycle position of the clutch, the ear 51 of clutch dog 50 is disposed within the notch 12a of the disc 12 thereby locking the disc and the shift drive train in full cycle position, centralizing the member 60, returning the collar 34 to normal position, and also returning the lever 250 to normal position by means of the linkage 1374, 1375, 1483, and 1481.

*Tabulator selection keys*

The ten tabulator keys, 200, 200a, and 200b (Fig. 1) correspond to the ten respective positions of the carriage, and the tabulator mechanism described hereinafter is set or controlled by any one or more of the keys depressed to determine the position or positions to which the carriage will be shifted. The right end or #1 tabulator key 200a causes or alternatively controls a carriage shift toward the left to bring the right end or #1 counter dial 1874 under the indicator 1875 and into operative position to be actuated by the counter actuating mechanism. In such carriage position the ten rightmost accumulator dials 318 stand in position for operation under control of the ten respective rows of numeral keys 100. Conversely the left end or #10 tabulator key 200b causes or alternatively controls a carriage shift toward the right to bring the #10 or leftmost counter dial 1874a into operative position, and the ten leftmost active accumulator dials into operative position with respect to the keyboard; while the intermediate tabulator keys #2 to #9 inclusive cause or control the carriage shift in either direction to the respectively numbered carriage positions, the carriage being shown in Fig. 1 in its #8 position as indicated by the arrow 1875.

Each of the intermediate tabulator keys includes a key stem 201 (Fig. 4) which is guided for up and down sliding movement in the frame 101 which supports the numeral keys 100, and abuts the top of a tabulator sub-key stem 202. The latter stem is guided for up and down sliding movement in a second key frame 208 and is provided with a spring 205 which urges the two key stems to the normal raised position shown in Fig. 4.

The sub keystem of each of the intermediate tabulator keys 200 is provided with an extrusion 209 (Figs. 4 and 5) which cooperates with a lock bar 213 in a way described in full in an Avery Patent No. 2,365,324, dated December 19, 1944, so that when any of the keys is partially depressed to the position shown in Fig. 5 the lock bar will lock the keys in such partially depressed position. If a second key is similarly depressed, it will become locked by the lock bar and concurrently release the first key from depressed position. There are no interlocks provided between the keys as shown in the last mentioned Avery patent and therefore two or more of the keys can be depressed simultaneously and latched in depressed position.

When keys 200 are in raised position (Fig. 4), the lower tip of the sub-key stems 202 are out of the path of a carriage position element 70 (Fig. 5) which travels in synchronism with the carriage, but when a key is depressed, the sub-key stem is positioned in the path of the bail, and by means of a shift terminating mechanism to be described hereinafter, terminates the carriage shifting operation when parts of the element 70 engage the sub-key stem, thereby stopping the carriage in the position corresponding to the key depressed.

The keys 200 may also be utilized for initiating a shift as will be described hereinafter by depressing the keys beyond their latched position. However, the full depression of a key from its latched position will not disturb the setting of any other latched keys and said key will return to its latched position when released by the operator.

The left end tabulator key 200b (Figs. 1 and 11) is provided for two purposes; namely, to initiate a shift of the carriage to its right end position and to release all other keys from latched position. The sub-key stem 204 is accordingly provided with an extrusion 209a which differs from the extrusions of the intermediate keys and is of such shape that when the key 200b is fully depressed, which is beyond the shift initiating position, it will move the lock bar 213 and release all latched intermediate keys, but cannot become latched itself.

In order that the operator may initiate a shift described above, but without releasing the other tabulator keys which are latched in their partially depressed position, the key 200b may be partially depressed against the rather light pressure of spring 205 (Fig. 11) to initiate the shift, but further depression is resisted by a relatively stronger spring 235c. If, however, the operator also wishes to release the other keys he may apply an extra pressure to the key whereupon the stronger spring will yield to permit the full depression of the key to release the other latched keys.

The right end tabulator key 200a (Figs. 1 and 9) is solely for the purpose of initiating a shift of the carriage to its left end position. The construction of this key and related mechanism is such that its depression will not release any latched intermediate tabulator keys 200.

*Tabulator control mechanism*

Since the carriage is situated at the rear of the machine, and the tabulator keys which control the position to which the carriage is to be shifted, are situated at the front of the machine, a carriage position element is mounted for transverse movement relative to said keys and the power for such movement is derived from the carriage so that the position element always moves in synchronism with the carriage and at all times assumes the position which characterizes the corresponding position of the carriage.

The driving mechanism from the carriage to the position element includes a rack 340 (Fig. 2), attached to the carriage 350, and having downwardly protruding teeth adapted to engage a spur gear 341 which is secured to the upper end of a shaft 342 supported by brackets on the machine frame. A bevel gear 343 (Fig. 1) is fixed to the lower end of said shaft and meshes with a second bevel gear 344 fixed to the left end of a worm shaft 275 which extends across the tabulator section of the machine.

The carriage position element 70 (Fig. 1) is mounted upon the worm shaft 275 and includes a worm nut 272 (Fig. 6) which has an inwardly depending stud that engages the groove 275a of the worm shaft. This nut is also provided with an arm 273 (Figs. 5 and 6) having a bifurcated tip which embraces a flange of the tabulator key section frame 208, thereby preventing rotation of the nut and causing a transverse movement of the nut upon rotation of the worm shaft 275. Thus, any movement imparted to the carriage 350 also imparts a corresponding transverse movement to the worm nut 272 and the position element in a direction opposite to that of the carriage, the position element being so positioned that when the carriage is in its extreme left end position, the element is at its right end position on the worm shaft in operative relation to the right end tabulator key, whereas when the carriage is in its extreme right end position the position element is in its extreme left position in operative relation to the left end tabulator key. Similarly, when the carriage is in an intermediate position such as the #8 position shown in Fig. 1, the position element 70 is in operative relation to the #8 tab key.

A bail 71 which composes the body of the carriage position element 70 is journaled upon the shaft 275 and embraces the worm nut 272 so that the element will travel along the shaft with the worm nut. The bail is not integral with the nut, however, and is free to rock a limited amount clockwise or counter-clockwise about the axis of the shaft. A torsion spring 72 is anchored at one of its ends to the guiding arm 273 of the nut while the other end of the spring is anchored to the flange of the bail to thereby urge the latter in a clockwise direction about said shaft, such clockwise movement being limited by an ear 73 of the bail riding along the edge of the lower flange of the tabulator key section frame 208 (Fig. 5).

Two tripper levers 75 and 76 (Figs. 6 and 7) are pivotally mounted on the bail of the carriage position element 70 by means of respective pivot studs 77 and 77a. The levers are spring urged in opposite directions by a common spring 78 and are limited in such direction by an ear 74 formed on bail 71 to normally locate the levers in the position shown in Fig. 7, wherein their surfaces 75a and b, and 76a and b may engage a stem 202 of a depressed tabulator key in a manner described below.

If a tabulator key to the left of the position element is depressed such as the one associated with the sub key stem $202_1$ (Fig. 7), and a shift is initiated which moves the position element toward the left, the cam surface 75a will engage the key stem $202_1$ and rock the control member downwardly as viewed in Fig. 7 to terminate the shifting operation in a manner described hereinafter, whereas if a key to the right, such as the one associated with key stem $202_3$ is depressed and if an opposite shift is initiated the position element moves toward the right, whereupon the cam surface 76a will engage the latter key stem and rock the position element down. If on the other hand the key stem $202_2$ is depressed and the carriage is brought to the corresponding position, the position element assumes the position shown in Fig. 7. If the carriage is then shifted out of this position in either direction, surfaces 75b and 76b respectively will engage the key stem $202_2$, but the spring 78 will yield and permit the respective tripper lever to rock about its pivot 77 or 77a without rocking the position element to shift terminating position. The tripper lever will thus pass by a depressed key without terminating the shifting operation and the carriage will shift without interruption to the position corresponding to the second key depressed or to an end position.

Shift directional control mechanism

The Marchant calculating machine in connection with which the present invention is disclosed, includes two shift direction control keys 1201 and 1202 (Figs. 1 and 3) which control the automatic shifting mechanism to shift the carriage toward the left or right respectively during multiplication calculations as described in detail in the aforementioned Avery Patent No. 2,216,659. The tabulator shift direction control mechanism is also controlled by these keys so that a tabulator shift is opposite to the direction of the shift during multiplication.

Figures 9, 10:
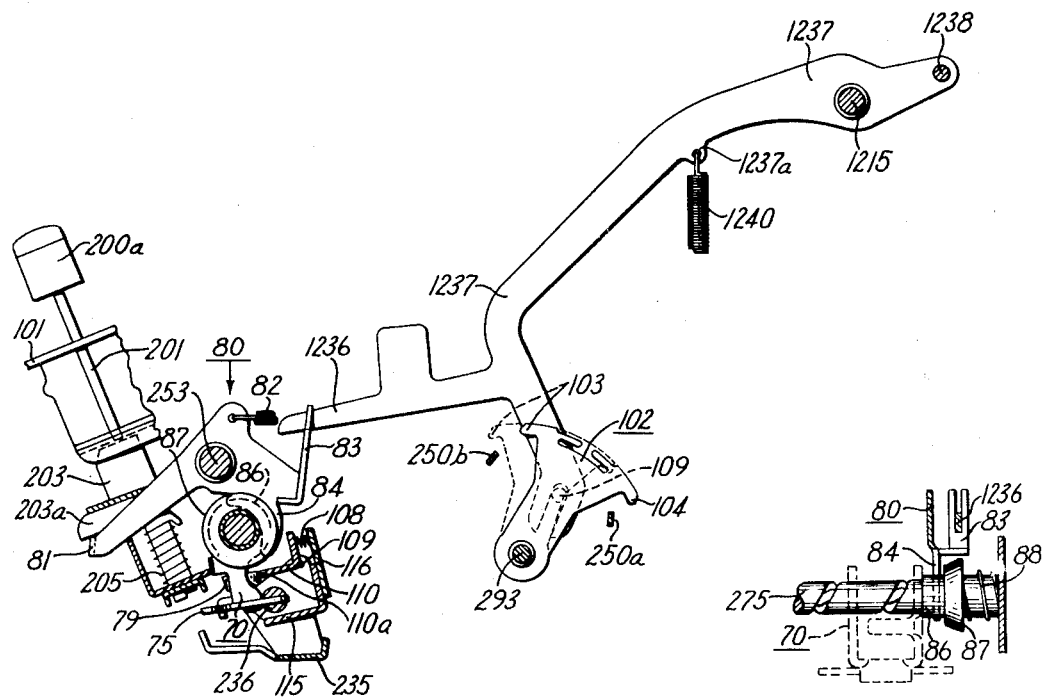
Fig. 9 is a right side view of the right end tabulator key and the mechanism for insuring a left tabulator shift.
Fig. 10 is a detail view taken from the front of the machine showing the latch controlled by the right end key for preventing the termination of a shift in an intermediate position.

The above shift direction control mechanism includes a lever 1237 (Figs. 3 and 9) which is pivotally mounted on a shaft 1215 and secured to a second lever 1214 by means of a stud 1238 so that the two levers compose a unit which is mounted for limited rocking movement upon shaft 1215. The lower end of arm 1237 has a bifurcated tip which embraces a stud 109 of a T member 102 that is pivotally connected by means of a stud 293 to the lower end of a tabulator shift starting member 252 (Figs. 4 and 9).

Since it is customary to perform multiplication beginning with the leftmost multiplier digit the shift direction control mechanism is spring urged into condition for causing a leftward carriage shift during multiplication and a rightward carriage shift during tabulation when both keys 1201 and 1202 are in their raised position. A spring 1240 is therefore connected between a lobe 1237a on lever 1237 thus urging the lever 1237 downwardly and the T member 102 toward the right as shown in Fig. 9 so that the arm 104 of the T member overlies an ear 250a of the shift operating lever 250. When the T member is lowered by the tabulator shift initiating mechanism to be described hereinafter, the arm 104 will contact ear 250a and rock the member 250 in a clockwise direction to cause a rightward shift of the carriage.

If multiplication is to be performed (backward), starting with the rightmost multiplier digit, the operator may depress the key 1202 which conditions the shift direction control mechanism for a carriage shift toward the right during multiplication as indicated by the arrow on key 1202 (Fig. 1), and in so doing changes the setting of the T member so that the tabulator shift will return the carriage toward the left.

The mechanism which effects this change in the setting of the shift direction controls includes an ear 1210 on the key 1202 (Fig. 3) which, upon depression of the key, engages the left arm of a lever 1290 and rocks the same counter-clockwise about its pivot. The right arm of lever 1290 engages a lever 1280 which is freely pivoted on shaft 1215 and connected to the levers 1214 and 1237 by means of a spring 1282 connected between stud 1238 and an ear 1281 on lever 1280. Consequently, depression of key 1202 rocks lever 1237 clockwise which moves the T member 102 toward the left as shown by dotted lines in Fig. 9, wherein the arm 103 overlies an ear 250b of the shift control lever 250 so that downward movement of the T member for initiating a tabulator shift will rock the lever 250 counter-clockwise to cause a leftward tabulator shift.

Concurrently, the depression of key 1202 rocks the lever 1214 downwardly to control a rightward carriage shift during multiplication. The positioning of lever 1214 as described above positions a member 1383 which although slightly different in form corresponds to a member of the same number in a Jessup et al. Patent No. 2,335,282 and engages an ear 1384 or 1217 in a manner described in said patent to initiate an automatic carriage shift toward the left or right respectively during a multiplying operation.

Tabulator shift initiating mechanism

The tabulator keys 200, 200a, or 200b may be used to initiate a shift in the following manner. Full depression of any of said keys moves the bottom of the key stem into contact with the turned-up edge of a bail 235 (Fig. 4) extending across the tabulator section of the machine and in so doing rocks the bail about its pivot studs 236 secured to the machine frame. Pivotally mounted on one end of the bail by means of a stud 233 is a trigger 243 urged in a clockwise direction by a torsion spring 234 and restrained in such direction by an arm 243a of the trigger contacting a sleeve on a shaft 246. A shoulder formed on this trigger underlies and is adapted to engage an ear 244 of a latch 240. Latch 240 is pivoted on a shaft 285 and is normally urged clockwise by a tension spring 240a extending between a starting lever 252 and the latch so as to hold a shoulder 240b on the under edge of 240 in latching engagement with an ear 245 of a toggle link 247 pivotally mounted on shaft 246. A second link 248 also comprising the toggle joint is connected to link 247 by means of a stud 249 and is connected to starting lever 252 by means of a stud 251 situated in an elongated hole in the starting lever. Lever 252 is freely pivoted on a frame stud 253 and is urged downwardly by means of a relatively strong spring 254 tensioned between the upper arm of the lever and the machine frame.

The stud 249 is slightly to the right as viewed in Fig. 4 of a line passing through the axes of studs 246 and 251, and the toggle therefore tends to collapse under pressure of spring 254, but this is normally prevented by the latch 240. Whenever the bail 235 is rocked counter-clockwise, the shoulder of trigger 243 engages the ear 244 and rocks the latch counter-clockwise against the action of spring 240a and thereby releases shoulder 240b from ear 245 to enable spring 254 to rock the starting lever downwardly, collapsing the toggle. The lowering of starting lever 252 pulls the T member 102 downwardly and in so doing causes one of its arms 103 or 104 to contact ear 250b or 250a (Fig. 3) of control lever 250, rocking it in either a clockwise or counter-clockwise direction to effect the operation of the carriage shift control mechanism previously described.

Secured to the lever 250 (Fig. 5) is a plate 151 carrying a roller 153 which normally is positioned opposite the face of an ear 152 of a latch 150 pivotally mounted on shaft 246 and spring urged clockwise by a torsion spring 154. The ear 152 is normally held a short distance away from the roller 153 by an ear 158 of a second latch 156 (Fig. 8) so as to permit freedom of movement of the shift operating member 250. When the starting member 252 (Fig. 4) is released and moved downwardly it carries the T member 102 with it and in so doing the latter member rocks the lever 250 (Fig. 5) clockwise or counter-clockwise and consequently moves the roller 153 above or below the ear 152. Slightly thereafter the far end of stud 293 (Fig. 4) engages the curved surface 156a of latch 156 (Fig. 8) and thus releases latch 150 from restraint of ear 158 whereupon the ear 152 moves above or below the roller 153 and maintains the member 250 in shift operating position until latch 150 is tripped by the shift terminating mechanism described hereinafter.

The starting lever 252 is automatically recocked to its normal position shown in Fig. 4 during the first cycle of operation of shift clutch 10 by mechanism fully disclosed in the aforementioned Patent Number 2,365,324.

The key 220 (Fig. 1) may also be used to initiate a tabulator shifting operation. Depression of this key rocks the bail 235 which, although in slightly different form, corresponds to the bail of the same number in the above patent and operates in the same way as described therein to initiate a tabulator shifting operation. The purpose of key 220 is to provide a conveniently positioned key for initiating a tabulator shift to the predetermined carriage position or positions without requiring the attention of the operator to select the particular column tab key corresponding to the desired carriage position each time a tabulator operation is to be initiated.

Tabulator shift terminating mechanism

The tabulator shift terminating mechanism is operable to stop the carriage in an intermediate position corresponding to a column tab key depressed or the nearest one of a plurality of keys depressed, whether initiated by an intermediate key or by the key 220. If the shift is initiated by an end tabulator key, however, a depressed intermediate key is ineffective to terminate the shifting operation and the carriage is thus brought to the respective end position.

The mechanism provided for terminating the shift when the carriage reaches a selected intermediate position includes a bail 115 (Fig. 5) which extends across the tabulator section of the machine and is supported for free rocking movement upon two pivot studs 236. A bracket 116 is secured to the bail 115 and a tension spring 113 connected between the bracket and the machine frame urges the bail counter-clockwise about its pivot. A portion of the machine frame not shown blocks an upturned ear 112 of the bracket and thus limits the counter-clockwise movement of the bail 115 to the position shown.

An angle shaped bail 110 (Figs. 5 and 9) is carried by the bail 115 and is mounted upon pivot points 109 in the end flanges of the latter bail to permit independent rocking movement of bail 110 about the pivot points 109. A spring 108 (Fig. 9) compressed between the bracket 116 of bail 115 and the upturned flange of bail 110 urges the latter counter-clockwise about pivots 109. A hook shaped extension 107 (Fig. 5) limits the counter-clockwise movement of bail 110 to the position shown, in which position the forward edge 110a of the substantially horizontal flange of bail 110 lies adjacent the roller 79 carried by the previously described carriage position element 70.

When a carriage shifting operation is initiated the element 70 (Figs. 5, 6, and 7) travels along the worm shaft as described hereinbefore, and when the leading tripper lever 75 or 76, as the case may be, contacts the key stem of a depressed tabulator key, the camming surface 75a or 76a rocks the element 70 counter-clockwise. If the shift is initiated by an intermediate tabulator key or the key 220, but not by an end tabulator key 200a or 200b, the bail 110 remains in the angular position shown with respect to the bail 115 so that the rocking movement of element 70 carries the roller 79 rearwardly or toward the right as viewed in Fig. 5 against the edge 110a of bail 110. The line of force, at the point of contact of the roller against the bail is slightly below the pivotal points 109 so that this bail 110 functions in this instance, as though it were an integral part of bail 115 upon which it is mounted; therefore, the rocking of element 70 rocks the bail 115 about its pivots 236. In so doing, an ear 117 of bracket 116 engages a nose 157 of latch 150 and trips the latch thereby freeing the member 250 (Fig. 5) and permitting the shift control dog 50 (Fig. 3) to be returned to its clutch disengaging position under the tension of spring 50a.

The above tripping operation occurs during substantially the mid portion of the shift cycle, but since the shift clutch is a full revolution clutch it does not disengage until the end of the current shift cycle; therefore, the carriage continues moving until it reaches the next operating position. During such movement the tripper lever 75 or 76 moves past the depressed tabulator key to the position shown in Fig. 7, thereby permitting the return of the carriage position element 70 and the shift terminating bail 115 to their normal positions shown in Fig. 5. The latch 150 (Fig. 8) will thus be free to operate upon initiation of another tabulator shifting operation.

When a tabulator shifting operation is initiated by an end tabulator key 200a or 200b or by the master key 220 (Fig. 1) with none of the intermediate keys 200 depressed, mechanism fully described in the aforementioned Jessup et al. Patent No. 2,235,282 becomes effective to terminate the shifting operation when the carriage reaches either end position. This mechanism includes a bail 361 (Fig. 3), corresponding to the part of the same number in said patent, which bail is brought into action by the carriage shifting mechanism with the carriage in an end position and actuates a lever 375 (Fig. 8) in a manner disclosed fully in said patent, thereby tripping the latch 150 and terminating the carriage shifting operation.

*Control by right end key for insuring a left tabulator shift*

The shift control key 1201 (Fig. 1) is effective upon depression thereof to condition the shift direction control mechanism for a right tabulator shift if and when the shift is initiated by the key 220 or by an intermediate tabulator key. If, however, the shift is initiated by the right end tabulator key 200a, the latter key supersedes the conditioning of the direction control mechanism and sets the same for a left tabulator shift even though the key 1201 remains latched down. This left shift condition is maintained only for the duration of the shifting operation which is initiated by the key 200a and upon termination of such shifting operation with the carriage in the left-end position, the direction control mechanism returns to its right shift condition under control of key 1201. The key 200a also renders any depressed intermediate tabulator key ineffective to terminate a shifting operation so that the carriage will pass through the position corresponding to the intermediate key depressed and shift directly to the left end position.

Upon depression of the key 1201 (Figs. 1 and 3) for conditioning the shift control mechanism for a leftward carriage shift during multiplication, an ear 1207 on the stem of key 1201 cams a lock bar 1208 toward the right thereby releasing ears 1209 or 1210 of the keys 1200 or 1202 respectively from restraint of the lock bar, so as to permit the latter keys to rise in a manner described in the aforementioned Jessup et al. patent. If the key 1202 were the one so released, the ear 1210 upon rising would release levers 1290 and 1280 and permit the spring 1240 to pull the lever 1237 downwardly, setting the T member 102 in the position shown in Fig. 9, wherein it conditions the tabulator mechanism for a rightward carriage shifting operation which may be initiated by depression of either the key 220 or an intermediate tab key 200.

If instead of returning the carriage toward the right by depression of the key 220, for example, the operator wishes to shift the carriage to its left end position without disturbing the setting of control key 1201 and/or a depressed intermediate tabulator key 200, then the right end key 200a may be depressed. The sub key stem 203 of the key 200a (Fig. 9) is provided with an arm 203a which overlies an ear 81 of a lever 80, pivotally mounted on frame stud 253 and spring urged clockwise by a tension spring 82 connected between an upper arm of lever 80 and the machine frame. An upwardly extending bifurcated arm 83 of lever 80 embraces the tip of an arm 1236 of lever 1237 so that depression of key 200a rocks the lever 80 counter-clockwise and raises lever 1237 against the tension of spring 1240, thereby setting the T member to its dotted line position shown in Fig. 9 in which position it conditions the tabulator shift initiating mechanism for a left carriage shift.

The above conditioning operation occurs during the early part of the depression of key 200a, and after the direction control mechanism is set thereby, the bottom of the key stem rocks the bail 235 counter-clockwise to initiate a tabulator shift in a manner described hereinbefore.

The mechanism which is responsive to depression of key 200a for rendering an intermediate tabulator key 200 ineffective to terminate the shifting operation includes a downwardly extending arm 84 (Fig. 9) of lever 80. The upturned flange of bail 110 lies in the path of arm 84 so that counter-clockwise rocking of lever 80 and arm 84 rocks the bail clockwise on its pivot 109 thus moving the forward edge 110a of the bail upwardly and out of the path of the roller 79 which is carried by the carriage position element 70 described hereinbefore. As the element travels along the worm shaft during the carriage shifting operation and engages the stem 202 (Fig. 5) of an intermediate tabulator key which may be depressed, and is consequently rocked counter-clockwise thereby, the roller 79 passes idly underneath the bail 110 without rocking the shift terminating bail 115 as described hereinbefore. The carriage thus passes through all intermediate carriage positions regardless of which one or how many intermediate tabulator keys are depressed. It will be noted further that the sub key stem 203 (Fig. 9) of key 200a does not have an extrusion 209 (Figs. 5 and 11) as do the intermediate keys 200 and the left end key 200b, therefore, the depression of key 200a does not effect the lock bar 213 and consequently does not release any of the other tabulator keys 200 which may be latched down.

Calculating machine operators normally depress a tabulator key only instantaneously to initiate a tabular shift; therefore, means are provided to maintain the setting of lever 80 (Fig. 9) for the duration of the carriage shifting operation so as to retain the bail 110 in disabled condition after the operator releases the key, the lever 80 and related mechanism being released for return to normal condition when the carriage reaches its end position. This means includes a bushing 86 (Fig. 10) which is journalled for free sliding movement upon the worm shaft 275 and urged toward the left by a spring 88, compressed between the machine frame and an annular beveled rim 87 on the bushing. The downwardly extending arm 84 (Fig. 9) which disables the bail 110 normally lies adjacent the left face of the rim 87 (Fig. 10) and blocks leftward movement of the same. When the lever 80 is rocked by key 200a as described above and the arm 84 moves upwardly and toward the right as viewed in Fig. 9, it moves out of the path of rim 87 and permits the spring 88 to slide the same toward the left to a position underlying the arm 84. In this position the rim blocks the return of the arm 84 and lever 80 after the operator releases the key 200a.

During the shifting movement of the carriage toward the left in response to depression of key 200a, the carriage position element 70 travels rightwardly along the worm shaft 275 and as the carriage approaches left end position, the right-hand flange of element 70 (Fig. 10) engages the left face of bushing 86 and slides the same toward the right against the force of spring 88 to the position shown, thus removing rim 87 from underneath arm 84 and permitting the spring 82 to return the lever 80 to the normal position shown in Fig. 9. The bail 110 is thus permitted to return to its normal operative position and the T member 102 and lever 1237 are permitted to return to the position shown, under tension of spring 1240.

*Control by left end key for insuring a right tabulator shift*

Figures 11, 12:
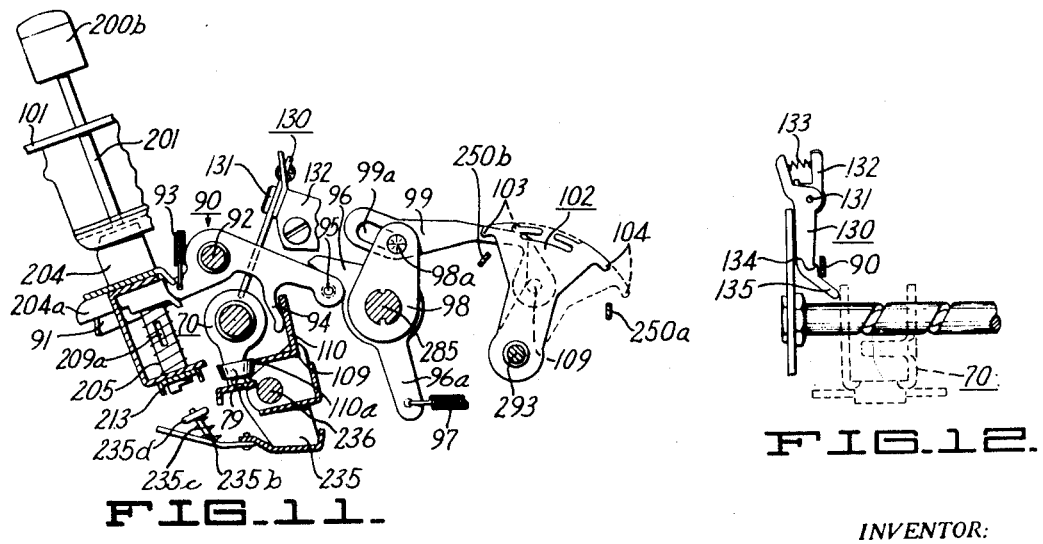
Fig. 11 is a right side view of the left end tabulator key and the mechanism for insuring a right tabulator shift.
Fig. 12 is a detail view taken from the front of part of the mechanism of Fig. 11 showing the latch controlled by the left end tabulator key for preventing the termination of a shift in an intermediate position.

If the key 1202 (Fig. 1) is depressed and the shift control mechanism is thus conditioned for a rightward shift during multiplication and a leftward tabulator shift, the T member 102 is set to the position shown in Fig. 11. The left end tabulator key 200b may be depressed to supersede this leftward tabulator shift setting by conditioning the T member for controlling a rightward shift. The key 200b also renders the intermediate tabulator keys ineffective to terminate a shifting operation, and initiates a tabulator shifting operation either with or without releasing the intermediate tabulator keys from depressed position as described hereinbefore.

The mechanism which sets the T member for a rightward tabulator shift includes a lever 90 (Fig. 11) freely pivoted on the stud 92 and urged clockwise by a spring 93. A left arm 91 of lever 90 underlies an arm 204a of the left end sub key stem 204, while the right arm of lever 90 carries a stud 95 which underlies the left arm of a bellcrank 96. This bellcrank is keyed to the left end of a shaft 285, while a lever 98 is keyed to the right end of the same shaft. A spring 97 connected between an arm 96a and the machine frame urges the bellcrank 96, shaft 285, and lever 98 counter-clockwise, such movement being limited by the arm 204a of key stem 204 blocking the clockwise movement of lever 90. The lever 98 carries a stud 98a which lies within an elongated hole 99a in the left end of a link 99, the right end of which is connected to the T member by a stud 109.

Depression of key 200b rocks the lever 90 counter-clockwise, bellcrank 96 and lever 98 clockwise and, through link 99, moves the T member 102 from its left shift position shown by full lines in Fig. 11 to its right shift position shown by dotted lines.

When the key 1202 (Fig. 3) is depressed and latched down it positively holds the levers 1299 and 1280 in their corresponding positions described hereinbefore; therefore, a yieldable connection is provided between lever 1280 and the lever 1237 so the latter may yield when the T member is set by the key 200b. This yieldable connection includes a spring 1282 connected between an ear 1281 formed on lever 1280 and a stud 1238 (Figs. 3 and 9) on lever 1237, therefore, even though the lever 1280 is positively held in its clockwise position by key 1202, the spring 1282 will yield and permit the lever 1237 to rock counter-clockwise in response to the right shift setting of the T member 102 by the key 200b.

The lever 90 also includes an arm 94 which lies adjacent the bail 110 (Fig. 11) so that counter-clockwise rocking of lever 90 by a partial depression of key 200b causes the arm 94 to engage the bail 110 and rock the same clockwise about its pivot 109, thereby moving the forward edge 110a above and out of the path of roller 79.

The arrangement is therefore such that if the key 200b is depressed to its intermediate position in which it initiates a tabulator shift but does not release any latched down intermediate keys, then such depression renders the depressed intermediate keys ineffective to terminate the tabulator shifting operation so that the carriage will shift directly to the right end position.

The present mechanism includes a means operable in response to depression of the key 200b to retain the shift terminating mechanism in disabled condition described above after the key is released by the operator, this means being released when the carriage reaches its end position to thereby allow the shift terminating mechanism to return to normal operative condition and also to allow the key 1202 to regain control of the shift direction control mechanism.

The above means includes a latch 130 (Figs. 11 and 12) freely pivoted on a stud 131 of a machine frame bracket 132, and urged counter-clockwise by a spring 133 compressed between an upstanding arm of the latch and the frame bracket 132. Counter-clockwise movement of the latch is normally blocked by the lever 90 but when the latter lever is rocked by depression of the key 200b the portion of lever 90 which is in contact with the latch moves upwardly permitting a shoulder 134 of the latch to move underneath the lower surface of lever 90 thereby retaining the same in its raised position. As the carriage shifts toward the right in response to depression of key 200b, the carriage position element 70 shown in dotted lines in Fig. 12 moves toward the left and when it reaches its end position the left flange of the element 70 engages an arm 135 and rocks the latch clockwise, thereby permitting return of lever 90 and related mechanism to the normal position shown in Fig. 11.

I claim:

1. In a calculating machine having a carriage shiftable to a plurality of operating positions including two opposite end positions and a plurality of intermediate positions, a drive train for shifting said carriage to any one of said positions, a plurality of tabulator keys including two end keys and a plurality of intermediate keys each corresponding to a respective one of said end and intermediate carriage positions, means for retaining one or more of said intermediate keys in depressed position, and means operable by depression of an end tabulator key for initiating operation of the drive train; the combination of, a carriage position element shiftable transversely in synchronism with the shifting movement of the carriage to establish a mechanical representation of the current position of the carriage, shift terminating mechanism including a member displaceable to terminate the operation of the drive train, an interponent between said element and said member and having a normally effective position in which it is operable to transmit movement from said element to said member to displace the latter and also having a second position in which it is ineffective to transmit such movement to said member, the aforementioned element being operable jointly by the depressed intermediate keys and by the shift drive train in accordance with the carriage position to cause operation of the shift terminating mechanism when the interponent is in its effective position, and disabling mechanism operable by an end key to move said interponent from its effective position to its ineffective position.

2. In a calculating machine having a carriage shiftable to a plurality of operating positions including two opposite end positions and a plurality of intermediate positions, a drive train for shifting said carriage to any one of said positions, a plurality of tabulator keys including two end keys and a plurality of intermediate keys each corresponding to a respective one of said end and intermediate carriage positions, means for retaining one or more of said intermediate keys in depressed position, and means operable by depression of an end tabulator key for initiating operation of the drive train; the combination of, a carriage position element shiftable transversely in synchronism with the shifting movement of the carriage to establish a mechanical representation of the current position of the carriage, shift terminating mechanism including a member displaceable to terminate the operation of the drive train, an interponent between said element and said member and having a normally effective position in which it is operable to transmit movement from said element to said member to displace the latter and also having a second position in which it is ineffective to transmit such movement to said member, the aforementioned element being operable jointly by the depressed intermediate keys and by the shift drive train in accordance with the carriage position to cause operation of the shift terminating mechanism when the interponent is in its effective position, disabling mechanism operable by an end key to move said interponent from its effective position to its ineffective position, a latch operable upon disablement of said interponent by said end key to hold the same disabled, and means actuated by the shift drive train upon movement of the carriage to a respective end position to release said latch.

3. In a calculating machine having a carriage shiftable to a plurality of operating positions including two opposite end positions and a plurality of intermediate positions, a drive train for shifting said carriage in either of two opposite directions, shift initiating mechanism for causing operation of said drive train, shift direction control mechanism adjustable to cause the drive train to shift the carriage in either selected one of said two directions, mechanism for terminating operation of the drive train, a plurality of tabulator keys including two end keys and a plurality of intermediate keys each corresponding to a respective one of said end and intermediate carriage positions, and means for retaining any one or more of said intermediate keys in depressed position; the combination of, devices controlled jointly by each of a plurality of depressed intermediate keys and by the drive train upon movement of the carriage into the proximity of a position corresponding to any of said plurality of depressed keys to cause operation of the shift terminating mechanism, means operable by the respective end keys to adjust the direction control mechanism for operation of the drive train in one or the other direction respectively and to cause operation of the initiating mechanism, and disabling means operable by either end key upon depression thereof to disable said devices.

4. In a calculating machine having a carriage shiftable to a plurality of operating positions including two opposite end positions and a plurality of intermediate positions, a drive train for shifting said carriage in either of two opposite directions, shift initiating mechanism for causing operation of said drive train, shift direction control mechanism adjustable to cause the drive train to shift the carriage in either selected one of said two directions, mechanism for terminating operation of the drive train, a plurality of tabulator keys including two end keys and a plurality of intermediate keys each corresponding to a respective one of said end and intermediate carriage positions, and means for retaining any one or more of said intermediate keys in depressed position; the combination of, devices controlled jointly by each of a plurality of depressed intermediate keys and by the drive train upon movement of the carriage into the proximity of a position corresponding to any of said plurality of depressed keys to cause operation of the shift terminating mechanism, means operable by the respective end keys to adjust the direction control mechanism for operation of the drive train in one or the other direction respectively and to cause operation of the initiating mechanism, means for maintaining the adjustment of the direction control mechanism after adjustment thereof by said end key, disabling means operable by either end key upon depression thereof to disable said devices, and restoring means operable by a part of said shift drive train upon movement of the carriage into an end position to render the maintaining means ineffective.

WILLIAM M. HARRISON.

REFERENCES CITED

The following references are of record in the file of this patent:

UNITED STATES PATENTS

| Number | Name | Date |
| --- | --- | --- |
| 2,082,098 | Christian | June 1, 1937 |
| 2,318,448 | Anderson | May 4, 1943 |
| 2,335,282 | Jessup et al. | Nov. 30, 1943 |
| 2,365,324 | Avery | Dec. 19, 1944 |
| 2,428,206 | Dustin | Sept. 30, 1947 |